Figure 1:
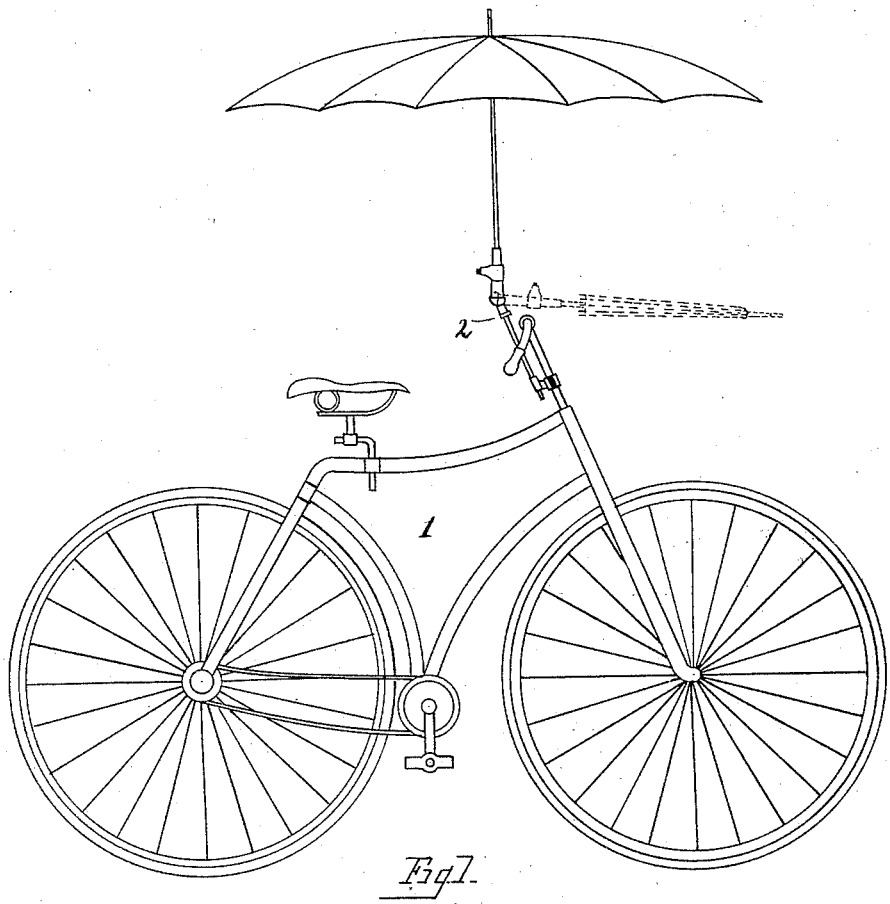

(No Model.)  2 Sheets—Sheet 1.

J. WHIPPLE.
UMBRELLA HOLDER FOR BICYCLES.

No. 467,360.  Patented Jan. 19, 1892.

WITNESSES
Carroll J. Webster
Floyd R. Webster

INVENTOR
Jerome Whipple
By Myers & Webster
Attys

THE NORRIS PETERS CO., PHOTO-LITHO., WASHINGTON, D. C.

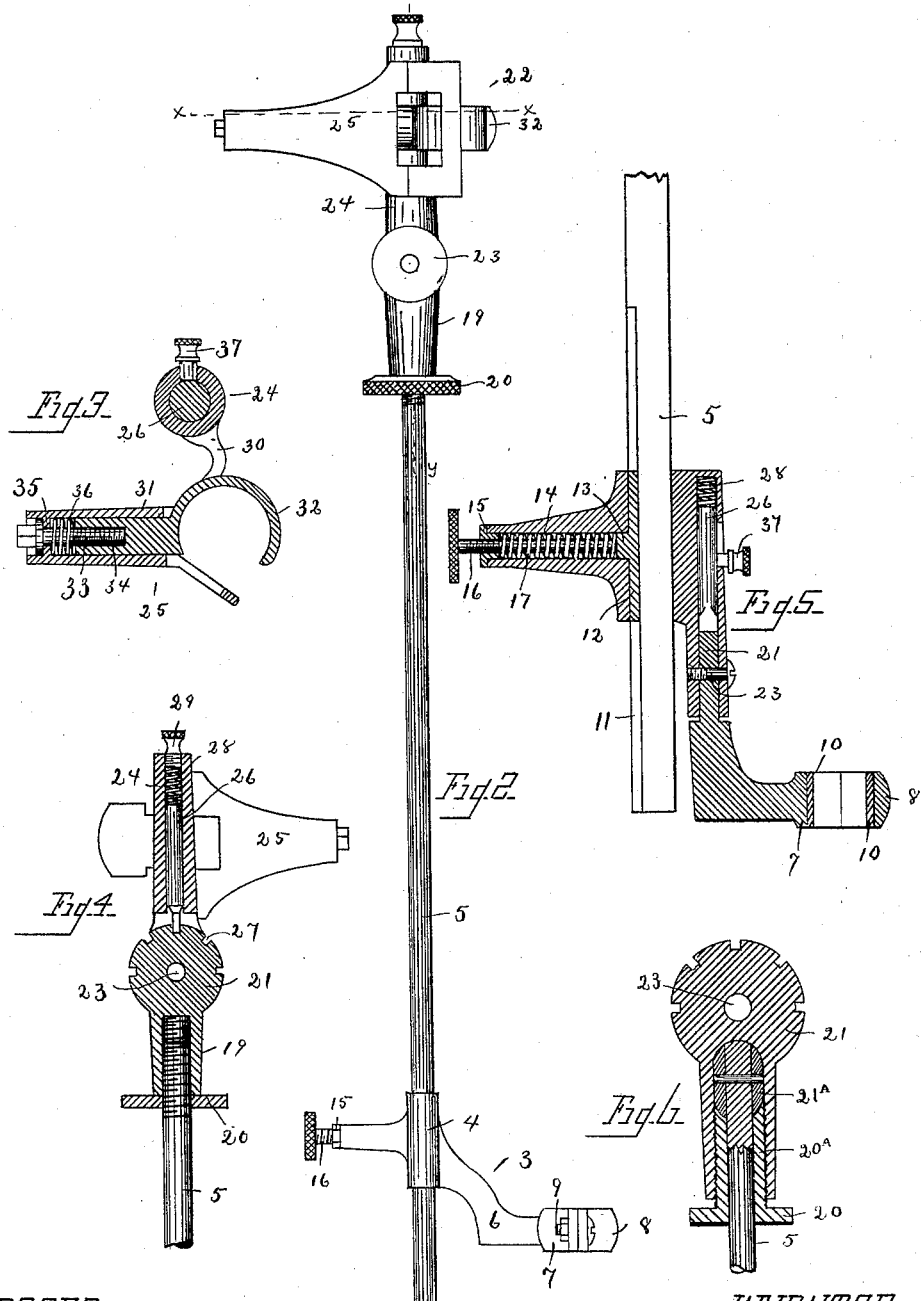

UNITED STATES PATENT OFFICE.

JEROME WHIPPLE, OF TOLEDO, OHIO.

UMBRELLA-HOLDER FOR BICYCLES.

SPECIFICATION forming part of Letters Patent No. 467,360, dated January 19, 1892.

Application filed October 29, 1890. Serial No. 369,667. (No model.)

*To all whom it may concern:*

Be it known that I, JEROME WHIPPLE, of Toledo, county of Lucas, and State of Ohio, have invented certain new and useful Improvements in Umbrella-Holders for Bicycles; and I do hereby declare that the following is a full, clear, and exact description of the invention, which will enable others skilled in the art to which it appertains to make and use the same, reference being had to the accompanying drawings, and to the figures of reference marked thereon, which form part of this specification.

My invention relates to an umbrella-holder for bicycles, and has for its object to provide means for supporting an umbrella in position to protect the rider of the bicycle from the sun's rays or from rain. At the present time only the most expert riders may indulge in the comfort of a shade from the sun's rays or from rain, as it requires one hand to support an umbrella, leaving but one hand to guide the bicycle, this practice even with an expert rider being attended with more or less danger, as, in the case of attempting to avoid an obstruction, the rider is compelled to either drop the umbrella to allow him the free use of both hands or risk the danger of striking the obstruction, with great probability of injury to both rider and bicycle.

My invention consists in providing an attachment for any style of bicycle whereby to hold an umbrella over the rider, with provision for inclining the umbrella to protect the rider from the sun's rays, irrespective of the height of the sun above the horizon.

The invention further consists in providing means for supporting an umbrella-carrying mechanism from the standard of the bicycle.

In the accompanying drawings, illustrating my invention, I have shown the device as clamped to a Safety bicycle.

In the drawings, Figure 1 is an elevation of a bicycle and holder in place thereon, the umbrella being directly over the seat, being also shown closed and swung out of the way in dotted lines. Fig. 2 is an elevation of the holder detached from the machine. Fig. 3 is a horizontal section on lines $x$ $x$. Fig. 2 illustrates the form of clamp used to firmly hold the umbrella. Fig. 4 is a vertical section on lines $y$ $y$ in a plane parallel with the drawing-sheet. Fig. 3 illustrates the means whereby the umbrella is given a universal movement to hold the same in any direction from which the sun's rays may come. Fig. 5 is a section of a modified form of clamp for clamping the holder to the fork of the machine, and Fig. 6 is a view showing a modified form of attachment of the rod and nut for giving a relative movement to the holder.

Having described the views illustrating the invention, I will now proceed to describe the parts in detail, like figures of reference indicating like parts throughout the views.

1 designates a bicycle, to which is clamped the umbrella-holder 2 by means of clamp 3. Clamp 3 is composed of a main portion 4, through which the rod 5 passes and is secured, and an arm 6, having formed on its outer end the sections 7 and 8 of the clamp, they being held together by the screw 9. To avoid abrasion of the handle, I employ a bushing 10, composed of leather, wood, or analogous material, formed of two sections corresponding to the sections 7 and 8 of the clamp.

As shown in Fig. 5, the lower end of rod 5 has a keyway 11 formed therein, in which a spline 12 fits, said spline having an enlarged boss 13, which protrudes in the boss 14. At the end opposite that occupied by the boss 13 is screwed a nut 15, through which thumb-screw 16 screws and bears against the boss on the spline. Around the screw and bearing on the boss is a coiled spring 17, the object of which will be apparent, as in lowering the device while in motion the operator has only the use of one hand, and when the set-screw 16 is loosed the spring tends to hold the spline against the rod 5, holding the rod in position, when the operator, by pulling up or down, raises or lowers the holder.

At the upper end of rod 5 is the casting 19, in which rod 5 screws and is held from turning by jam-nut 20, as shown in Fig. 4. On the upper end of casting 19 is a ratcheted enlarged head 21, to which is pivotally connected the umbrella-holder 22 by screw 23.

The umbrella-holder is constructed of a tubular support 24 and the clamp 25. The lower end of the said support is bifurcated and straddles the ratcheted head 21 of the casting, and is pivotally connected therewith by means of the screw 23. Within the support is mounted a vertical catch 26, the lower head of which engages the notches 27 of the ratcheted end 21 of the casting. To retain and depress the catch is a spring 28, taking tension from a thumb-screw 29, tapped in the upper end of the tubular support 24. On the main casting 24 are arms 30, carrying a holder 31 for the catch 32, said catch being operated by means of screw 33, tapped in the end of the catch, as at 34, and bearing against an annular projection 35 in the interior of the holder. The outer end of the screw 33 is squared to engage a key, the spring 36 acting to throw the holder out when the screw is loosed. The clamp 25 is provided with a jaw 36', which extends outward and at an angle to the catch 32 and forms an angular clamping-jaw, into which the umbrella-handle is forced when the catch 32 is actuated by the screw 33. This construction not only admits of the said handle being securely clamped in place, but also admits of the clamp being adjusted to hold handles of different sizes, which would not be the case if the walls of the jaw 36' extended parallel to the bore of the holder.

In operation the device after having been clamped to the machine by screwing screws 9 and tightening sections 7 and 8 the umbrella is inserted in the clamp and the same is ready for use. To adjust the same to any angle that may be desired to shield the rider, rotary movement is given by unscrewing the jam-nut 20 and turning the umbrella-clamp until it assumes the position desired, and then tightening the nut, securely holding the same in place. It is obvious, however, that other means may be employed for securing the umbrella-clamp in place other than the jam-nut 20. By raising catch 26 out of engagement with the ratcheted head 21 of the casting the umbrella-holder may be adjusted to different positions in a vertical plane and be held in such adjustment by allowing the catch to engage the notch immediately below it. Therefore it will be seen that by means of the rotary and vertical adjustment the umbrella will assume any position desired.

In Fig. 5 I have shown a modification in which the catch and ratchet mechanism is placed in the clamp for securing the device to the machine. It will be seen that this form is not so advantageous as that already described, as the umbrella can only be moved in a vertical plane. It will be seen that I may have a lug integral with the handle, through which the rod 5 passes, a set-screw subserving the purpose to hold the same in position without departing from the spirit of my invention.

In the modification shown in Fig. 6 the rod 5 is secured in a block by means of a transverse pin, and the jam-nut is screw-threaded at 20 to be screwed into the interior screw-threaded portion of casting 19, the object being to secure greater frictional contact of the parts to prevent the holder from turning except where desired. It will also be seen that by my construction the parts are simple of construction and not liable to rattle or become loose, as the springs take up all wear; and also by the use of the springs the device is convenient of operation, they serving to hold the parts together while changing the adjustment, thereby making it practicable to the operator while in motion. It will also be seen that by means of the device an umbrella can be carried closed, thereby doing away with the necessity for strapping it to the machine.

Having thus described my invention, what I claim, and desire to secure by Letters Patent, is—

In an umbrella-holder for bicycles, a clamp adapted to be secured to the bicycle and a rod adjustably connected therewith, in combination with a casting rotatably mounted upon the upper end of the rod, said casting having a ratcheted head, a tubular support pivoted upon the said head and carrying a catch adapted to engage notches in the head, a clamp carried by the standard and having an angular clamping-jaw, an adjustable catch carried by the clamp, and means for moving the catch to and from the said jaw.

In testimony that I claim the foregoing as my own I affix my signature in presence of two witnesses.

JEROME WHIPPLE.

Witnesses:
WILLIAM WEBSTER,
FLOYD R. WEBSTER.